US011633938B2

(12) United States Patent
Tienitsch et al.

(10) Patent No.: US 11,633,938 B2
(45) Date of Patent: Apr. 25, 2023

(54) MULTI-LAYERED FABRIC

(71) Applicant: TIESNITSCH BEHEER B.V., Beek Ubbergen (NL)

(72) Inventors: Johannes Ijsbrand Tienitsch, Beek (NL); Lieven Valeer Karel Bekaert, Zonhoven (BE)

(73) Assignee: TIESNITSCH BEHEER B.V., Beek Ubbergen (NL)

( * ) Notice: Subject to any disclaimer, the term of this patent is extended or adjusted under 35 U.S.C. 154(b) by 0 days.

(21) Appl. No.: 16/977,927

(22) PCT Filed: Mar. 7, 2019

(86) PCT No.: PCT/NL2019/050146
§ 371 (c)(1),
(2) Date: Sep. 3, 2020

(87) PCT Pub. No.: WO2019/172761
PCT Pub. Date: Sep. 12, 2019

(65) Prior Publication Data
US 2021/0037901 A1 Feb. 11, 2021

(30) Foreign Application Priority Data
Mar. 8, 2018 (NL) ..................................... 2020555

(51) Int. Cl.
*B32B 5/24* (2006.01)
*B32B 5/16* (2006.01)
(Continued)

(52) U.S. Cl.
CPC .................. *B32B 5/24* (2013.01); *B32B 5/16* (2013.01); *B32B 5/30* (2013.01); *B32B 7/14* (2013.01);
(Continued)

(58) Field of Classification Search
CPC .... B32B 5/24; B32B 5/16; B32B 5/30; B32B 7/14; B32B 2262/0253; B32B 2262/0284; B32B 2307/726; B32B 2437/00
(Continued)

(56) References Cited

U.S. PATENT DOCUMENTS 4,580,408 A 4/1986 Stuebner
5,830,496 A * 11/1998 Freeman ............. A61F 13/0273
424/443
(Continued)

FOREIGN PATENT DOCUMENTS

CN 103027407 4/2013
CN 103635164 3/2014
(Continued)

OTHER PUBLICATIONS

Office Action, CN Appln. No. 201980026326.2, dated May 5, 2022.
(Continued)

*Primary Examiner* — Betelhem Shewareged
(74) *Attorney, Agent, or Firm* — Nixon & Vanderhye P.C.

(57) ABSTRACT

The invention relates to a multi-layered fabric comprising an absorption layer between two liquid-permeable layers, which multi-layered fabric has a surface with: 1) one or more connection areas wherein a connection is present between both layers; and 2) one or more absorption areas wherein both layers are not connected to each other. The absorption areas are capable of absorbing a liquid whereby the liquid is absorbed by the absorption layer. The connection between the layer L1 and the layer L2 comprises a fusion of the layer L1 and the layer L2, which fusion optionally also includes the absorption layer.

14 Claims, 3 Drawing Sheets

Figure 1:
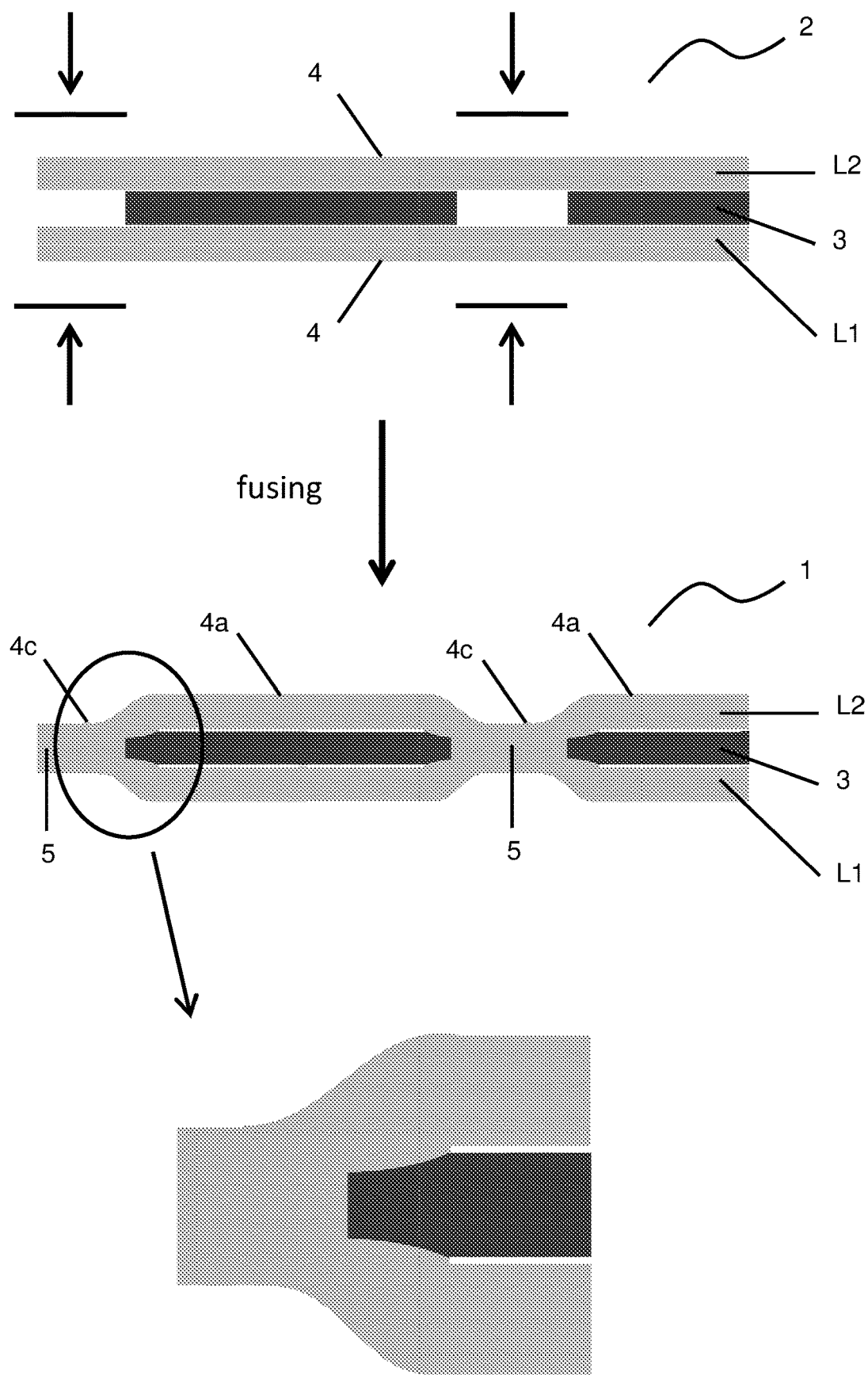

(51) Int. Cl.
*B32B 5/30* (2006.01)
*B32B 7/14* (2006.01)

(52) U.S. Cl.
CPC .............. *B32B 2262/0253* (2013.01); *B32B 2262/0284* (2013.01); *B32B 2307/724* (2013.01); *B32B 2307/726* (2013.01); *B32B 2437/00* (2013.01)

(58) Field of Classification Search
USPC ...................................................... 428/198
See application file for complete search history.

(56) References Cited

U.S. PATENT DOCUMENTS

2005/0118383 A1   6/2005  Cargill et al.
2016/0228290 A1*  8/2016  Davidson ................ A61F 7/02

FOREIGN PATENT DOCUMENTS

| WO | 2012/156067 | 11/2012 |
| WO | 2015/036788 | 3/2015 |

OTHER PUBLICATIONS

International Search Report for PCT/NL2019/050146 dated Aug. 19, 2019, 3 pages.
CN Official Action, CN Application No. 201980026326.2, dated Feb. 8, 2023.
CN Search Report, CN Application No. 201980026326.2, dated Feb. 6, 2023.

* cited by examiner

MULTI-LAYERED FABRIC

This application is the U.S. national phase of International Application No. PCT/NL2019/050146 filed Mar. 7, 2019 which designated the U.S. and claims priority to NL Patent Application No. 2020555 filed Mar. 8, 2018, the entire contents of each of which are hereby incorporated by reference.

The invention relates to a multi-layered fabric, to a method for preparing such fabric, a fabric obtainable by such method and a garment comprising the fabric.

People and animals may bring down their body temperature by the evaporation of water on their skin—water that is excreted by themselves in the form of sweat. This principle of evaporative cooling may also be used in technical means to support the natural cooling of a body, for example in cooling garments. The water is then contained in the garment by a special water absorbing substance, such as a super absorbent polymer of the type that is present in diapers and feminine napkins. These are known to be capable of holding up to 300 times their weight of water. The water-absorbing substance is typically immobilized in the garment by enclosing it between two layers of the fabric that constitutes the garment. By contacting the garment with water (e.g. by submerging), the water-absorbing substance in the garment absorbs the water. This activates the garment and makes it ready for use.

It is for example known to provide a cooling garment wherein two layers of (outer) fabric that enclose a layer comprising a super absorbent polymer (SAP) are stitched together. The stitching lines then define pockets in the garment, which pockets will swell during an uptake of water by the SAP. The particular pattern in which the stitching is carried out defines the shape and size of the pockets (e.g. a square, diamond or rectangular form). The presence of the SAP as a layer has the advantage that the material is evenly distributed through each pocket.

A disadvantage of this method lies in the methods of connecting both layers. The stitching causes punctures in the fabric, which easily allows leakage of water through the punctures. This may already occur by wearing or bending of the fabric, because this generates some extra tension on the pockets—tension that occurs in addition to the tension that has been built up by the absorption of water. Due to the extra tension, the SAP releases some of the water which then flows through the punctures. After its collection at the surface of the garment, the water drips from the garment on e.g. the ground, without having provided any cooling on the garment due to evaporation. This makes such garments less effective and leads to undesired wetting of other objects and/or body parts.

A more worse effect of punctures in the fabric is that also the SAP itself may leak out of the garment when the garment is activated. This permanently reduces the effectivity of the garment (also after re-activation) and contaminates the outside of the garment and its user. Typically, such garment has a sticky surface, and when body parts (such as a wearer's hands) touch this surface, these body parts get sticky too.

It is therefore an objective of the invention to provide a cooling garment wherein the fabric is not punctured so that the water and/or the activated SAP is/are properly contained in the pockets.

It is also an objective of the invention to provide a cooling garment with a better cooling performance than known cooling garments, in particular a cooling garment that is more effective than known cooling garments.

It is also an objective to provide a method for manufacturing a cooling garment that is less laborious.

It has now been found that one or more of these objectives can be reached by using a particular material, and/or by applying a particular process step.

Accordingly, the present invention relates to a multi-layered fabric, comprising an absorption layer between a liquid-permeable layer L1 and a liquid- and/or vapor-permeable layer L2, which fabric further has a surface comprising
- one or more connection areas wherein a connection is present between the layer L1 and the layer L2;
- one or more absorption areas wherein no connection is present between the layer L1 and the layer L2, which absorption areas are capable of absorbing a liquid whereby the liquid is absorbed by the absorption layer and contained between the layer L1 and the layer L2 in the absorption areas;
- wherein the connection between the layer L1 and the layer L2 comprises a fusion wherein at least the layer L1 and the layer L2 participate.

FIG. 1 displays a cross-section of a first multi-layered fabric of the invention.

Figure 2:
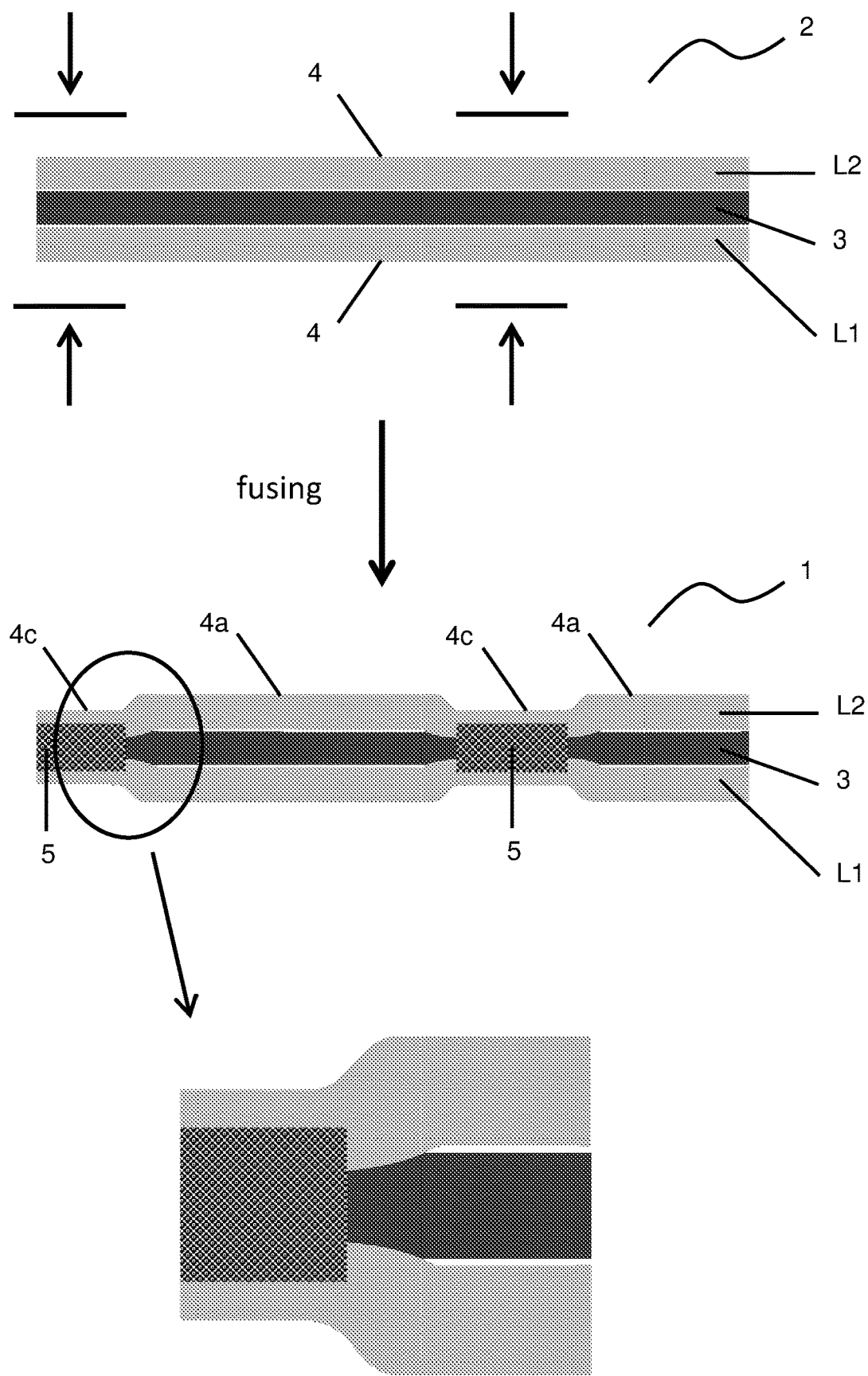

FIG. 2 displays a cross-section of a second multi-layered fabric of the invention.

Figure 3:
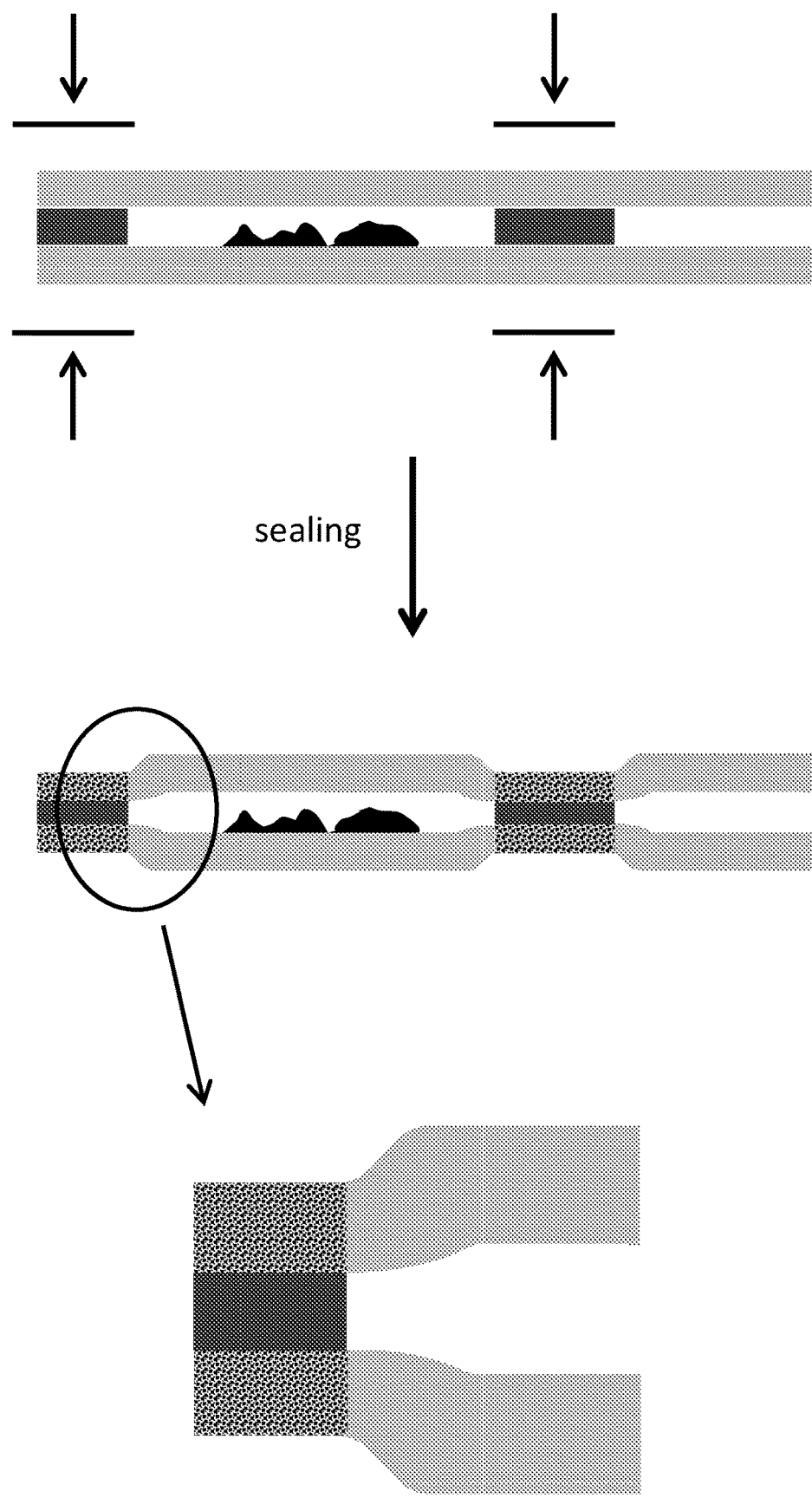

FIG. 3 displays a cross-section of a multi-layered fabric known in the art.

A multi-layered fabric of the invention comprises two outer layers; a liquid-permeable layer L1 and a vapor- and/or liquid-permeable layer L2. Between these two layers the absorption layer is present. During use of the fabric for cooling a body, this layer contains the liquid, typically water. The fabric is then regarded as being activated.

A multi-layered fabric of the invention may have a uniform thickness, but it may also be thinner at the connection areas than at the absorption areas. The thickness of a multi-layered fabric of the invention (or the thickness of the absorption areas when the connection areas are thinner than the absorption areas) is usually in the range of 0.5-25 mm when the fabric is not activated. Preferably it is in the range of 1-10 mm. When the garment is activated by allowing the (initially dry) absorption areas to take up water, then the thickness of the connection areas usually remains unaltered. The thickness of the absorption areas may however undergo a multiple increase of thickness during the absorption process. Their thickness after sufficient absorption has occurred is typically in the range of 5-50 mm.

Both layers L1 and L2 are typically single layers of fabric. They may, however, in principle also comprise sub-layers, for example an inner sub-layer adjacent to the absorption layer and an outer sub-layer at the interface with the environment, but this is on the condition that the fusion of the layer L1 and the layer L2 comprises all sub-layers. For example, when a fabric of the invention comprises an outer sub-layer as a part of the layer L1, then this outer sub-layer is also connected to the layer L2.

An advantage of the use of sub-layers is most pronounced when the respective layer L1 or L2 is liquid-permeable. When such layer L1 or L2 comprises sub-layers, then these sub-layers reduce the amount of liquid that finally reaches the surface of the layer L1 or L2 at the interface with the environment. This has the effect that the surface of the interface with the environment remains substantially dry, while the evaporative cooling is still effective. A dry surface improves wearing comfort of the fabric, in particular when it is present in a garment that is worn by a person.

When the fabric is used to cool a body, then the layer L1 is typically facing the body to be cooled, preferably being in contact therewith. Heat from the body then passes this layer L1 and is subsequently absorbed by the (activated) fabric, in particular by the water-containing absorption layer. The layer L2 is typically in contact with the environment, i.e. the larger atmosphere around the fabric (and the body to be cooled). Liquid and/or vapor in the (activated) fabric then permeate(s) through this layer L2. In the case of permeation of a liquid, this is followed by evaporation of the liquid and escape of the resulting vapor into the environment. In the case of permeation of a vapor, the evaporation has already taken place in the pocket between the layer L1 and the layer L2. After permeation, the vapor escapes into the environment. In any of the two cases, the evaporation is aided by the heat provided by the body. The speed of evaporation then also depends on the relative humidity of the environment.

Whereas the layer L1 needs to be liquid-permeable, the layer L2 is permeable to liquid and/or to vapor. Usually, however, both layers L1 and L2 are liquid-permeable. The layer L2 may then have the additional property that it is vapor-permeable. Likewise, the layer L1 may also have the additional property that it is vapor-permeable.

In case L2 is only vapor-permeable, then the vapor-permeability can act as a limiting factor for the cooling capacity of the fabric of the invention. This may occur when the rate of evaporation exceeds the rate of the vapor transport through permeation. This may be the case when there is e.g. a low relative humidity in the environment and/or when there are large quantities of heat supplied from the body to the fabric. The limit on vapor-permeability sets a minimal duration of the fabric's cooling performance. For some applications, it may be an advantage that this duration is known, for example during certain sports activities or construction works wherein water is scarce and/or wherein there is no time to reactivate the fabric by the addition of fresh water.

The liquid-permeability of L1 provides the fabric the possibility to absorb excreted sweat from a body, L1 being at the side of the fabric that faces the body that wears the fabric. The liquid-permeability also allows the uptake of liquid during the activation of the fabric, e.g. when it is immersed in water. The layer L2, when present at the evaporation side of the garment, allows the transport of liquid and/or vapor from the absorption layer through the layer L2. Any vapor that has passed the layer L2 is then released into the environment, while any liquid that has passed the layer L2 is evaporated to form a vapor that is then released into the environment. In any case, the energy required for the evaporation is at least partly withdrawn from the fabric.

By the liquid- and vapor-permeability of an object is meant that the object allows a liquid and a vapor, respectively, to permeate through its structure, so that transport of liquid and vapor, respectively, occurs through the material of the object. It is understood that in the case of liquid-permeability, this transport of liquid is different from the transport that occurs when liquid would leak through punctures and/or perforations that are the result of stitching of the layers to form the fabric of the invention. Transport of water by permeation does not occur through a puncture or perforation in the layer, but through pores that are present in the layer—pores that are typically formed during the manufacturing process of the fabric of the respective layer out of fibers.

The cooling-liquid that is typically used with a fabric of the invention is (liquid) water. The layers L1 and L2 are therefore preferably water-permeable. This means that liquid water is allowed to permeate through the layer, but that the layer is essentially non-permeable to any SAP.

In principle, the permeability of both layers concerns the permeability for the same compound. For example, when the layer L1 is permeable to liquid water, then the layer L2 is also permeable to liquid water in case it is liquid-permeable, and permeable to water vapor in case it is vapor-permeable.

The layers L1 and L2 are not necessarily the same. They may for example be of a different material. They may also be of materials that differ in chemical composition. Any difference between the materials of the layers L1 and L2 is however on the condition that the different materials can be fused to each other so that a connection is formed between both layers. Preferably, the layers L1 and L2 are of the same material, or at least substantially the same material. For example, the materials may differ in the thickness of the yarn, or in the extrusion shape of the yarn.

The layers L1 and L2 may also be of a different thickness and/or have a different surface texture, including differences that occur due to a different manufacturing method, such as methods leading to a woven or a knitted fabric. When this is the case, they may be of a different material or of the same material. For example, the outer surface of the multi-layered fabric that is in contact with the body that is to be cooled (typically the layer L1) may provide an advantageous sensation to the skin and/or has high heat-exchange properties, while the opposite outer surface that is facing the environment (typically the layer L2) may have a surface finishing that allows an effective evaporation of the liquid and/or is visually attractive.

The layers L1 and L2 may also have a different liquid-permeability, in particular a different water-permeability. For example, the layer L2 that is in contact with the environment and from which most of the evaporation takes place during use, may have a higher or a lower water-permeability than the layer L1 that provides the cooling effect to the body.

It is essential, however, that at least the layer L1 is liquid-permeable, in particular water-permeable. The layer L1 that is in contact with the body to be cooled has to be capable of transporting sweat excreted by the body (or at least the water that is contained in the sweat) to the absorption layer in the fabric. Although sweat production of the body will severely be reduced by the fabric when it is worn as e.g. a cooling garment on the body, sweat may still be excreted by the body. This sweat has to be taken up by the fabric rather than that it accumulates between the body and the fabric and in the end seeps downwards to e.g. other body parts and ultimately to the ground. When this happens, the cooling garment is less effective, because the sweat is not used for cooling the fabric and the body.

In known cooling garments wherein two layers of (outer) fabric enclose an absorption layer, the two outer layers are stitched together. If glue or sealing tape would be used for this purpose, then this would have to be applied on both sides of the absorption layer, which is highly inconvenient. Due to the conventional stitching, however, the fabric gets punctured, so that the water and possibly also the SAP may seep out of the multi-layered fabric (in particular out of the pockets of the garment) when it is loaded with the liquid and subjected to pressure. Very low pressures already have this effect, such as the pressures exerted when the wearer of the garment simply moves his body so that the fabric adapts a different three-dimensional shape.

It has now been found that, instead of stitching, the outer layers can also be connected to each other by fusing them, wherein the absorption layer may also be included in the fusion. To this end, the materials of the layers L1 and L2 typically have the property that they are fusible. By this property is meant that two or more pieces of such material can be joined together to form one entity by heating them to above their glass transition temperature ($T_g$) and then pressing them together so that the two or more pieces coalesce. After cooling down, a connection between the two or more pieces has been formed. This connection then comprises a fusion wherein each of the pieces participates.

When this process is performed on layer L1, layer L2, and a third item (such as the absorption layer), then the resulting connection between these three items comprises a fusion wherein the layer L1, the layer L2 and the third item participate (FIG. 2). When this process is performed solely on the layer L1 and layer L2, then the resulting connection between these two layers comprises a fusion wherein only the layer L1 and the layer L2 participate (FIG. 1). In any connection between the layer L1 and the layer L2 in a fabric of the invention, a fusion is present wherein at least the layer L1 and the layer L2 participate.

The temperature of joining such items together lies in principle above the glass transition temperature of the items. Usually, they are joined below their melting temperature, for example at a temperature of at least 5° C., at least 10° C., at least 15° C., at least 20° C., at least 25° C., at least 30° C. or at least 40° C. below their melting temperature. In principle, they may also be joined at or above their melting temperature.

The fusible materials in a fabric of the invention are preferably thermoplastic materials. By thermoplastic is meant the property of a material, usually a polymer, that it becomes soft when heated and hard when cooled. When the layer L1 and the layer L2 comprise a thermoplastic material, then this is advantageous for realizing a strong and durable fusion between them. The layer L1 and the layer L2 may, independently of each other, comprise a thermoplastic material selected from the group of acrylate polymers, acrylate copolymers, methacrylate polymers (such as poly(methylmethacrylate)), methacrylate copolymers, polyesters (such as polyethylene terephthalate), polyolefins (such as polypropylenes, polyethylenes, polymethylpentenes, polystyrenes and polybutylenes), polyurethanes, poly(ether-ester) elastomers, poly(vinylacetate), ethylene-vinyl acetate co-polymers, vinyl ester polymers, and mixtures thereof.

When the absorption layer is included in the fusion, then the coalescence of the layer L1 and the layer L2 also comprises coalescence of the absorption layer. In this way, the three items are fused together to form one entity at the connection areas. Thus, the connection between the layer L1 and the layer L2 may comprise a fusion wherein the layer L1, the layer L2 and the absorption layer participate.

This is illustrated in FIG. 2, which displays the cross-sections of the multi-layered fabric (1) before and after the fusing. The fusing is performed on three layers: the layer L1, the layer L2 and the absorption layer (3). All three layers then participate in the fusing. After the fusing, the layer L1 and the layer L2 are connected by the fusion (5) thus generated, with the absorption (3) layer also being part of the fusion (5). The surface (4) of the multi-layered fabric (1) comprises connection areas (4c); in these areas a connection has been formed between the layer L1 and the layer L2. The surface (4) also comprises absorption areas (4a); these are area(s) where no fusion has occurred and wherein the layers have remained essentially unchanged. They are still separate entities in these areas.

A successful inclusion of the absorption layer in the fusion typically relies on the properties of support material that is usually present in the absorption layer. Such support material is then designed such that it is fusible with the material(s) of the layers L1 and L2, e.g. it is a thermoplastic material and is of a similar nature as the material(s) of the layers L1 and L2 (a more detailed description of the components of the absorption layer and the fusibility is given hereinbelow). It has actually been found that the absorption layer, when properly designed, may be incorporated in the fusion without impairing the fusion, and possibly even with improving the fusion.

It is also possible that the absorption layer is not included in the fusion, i.e. that it is not part of the coalescence of the layers L1 and L2. In such case, the absorption layer comprises e.g. a plurality of openings, such as intended perforations or accidental crevices or chinks due to non-uniformities in the absorption layer. Any opening (or part thereof) that is located at a connection area of the fabric then allows the material of the layers L1 and L2 to fuse through the opening (or part thereof). An opening can then be considered to provide a bridge between both layers.

A situation wherein the absorption layer is not included in the fusion is illustrated in FIG. 1, which displays the cross-sections of the multi-layered fabric (1) before and after the fusing. The absorption layer (3) has discontinuities at the displayed cross-section. The fusing is performed on the layer L1 and the layer L2, and is performed at those locations where there is a discontinuity in the absorption layer (3). In this way, the absorption layer (3) does not participate in the fusing. After the fusing, the layer L1 and the layer L2 are connected by the fusion (5) thus generated. The surface (4) of the multi-layered fabric (1) comprises connection areas (4c); in these areas a connection has been formed between the layer L1 and the layer L2. The surface (4) also comprises absorption areas (4a); these are area(s) where no fusion has occurred and wherein the layers have remained essentially unchanged. They are still separate entities in these areas.

In a specific embodiment, the locations of the openings in the absorption layer substantially entirely coincide with the locations of the connection areas, so that the presence of absorption layer is minimized at the locations where a connection area is desired.

The materials of the layer L1 and the layer L2 are often the same. This usually provides the best, and in particular the strongest, fusion between both layers. In order to be fusible, however, the materials of the layer L1 and the layer L2 do not necessarily have to be the same. For example, two materials with comparable molecular structure and similar glass transition temperatures may also be fusible with each other. The person skilled in the art knows which different materials are fusible, or at least will be able to provide such materials by routine experimentation and without exerting inventive effort. When both layers L1 and L2 are of different materials, then this is often for reasons of wearing comfort and/or visual appearance of the multi-layered fabric of the invention.

Other cooling garments known in the art have a connection between two outer layers of fabric that relies on the presence of glue or sealing tape. The connections that can be obtained with these means are fundamentally different from those that are formed by a fusion of two or more materials. This is because the connection that is realized by a fusion of two or more materials depends solely on the fusion of these materials and not on the presence of an extra material (such as a glue or a sealing strip) that has adhesive properties from itself. Moreover, the coalescence of thermoplastic materials that are fused comprises the interpenetration and/or entanglement of the polymer chains of the materials, which does not occur when an additional material with adhesive properties is used.

This is illustrated in FIG. 3, displaying a known structure wherein glue or sealing tape is present between the two outer layers of fabric. At the interface of each outer layer with the glue or sealing tape, the glue or sealing tape penetrates through the outer layer, typically through the fibers. This does however not occur not vice versa, i.e. the outer layers do not penetrate into the glue or sealing tape. This discriminates inter alia the fusion of the invention from known connection methods with glue, sealing tape and the like.

It is thus an advantage of a multi-layered fabric according to the invention that the layer L1 and the layer L2 are connected by a fusion instead of a stitching. This is an advantage because the layers then do not contain the punctures that are inherent to stitching, so that neither the liquid alone nor the absorption material with absorbed liquid can leak out of the absorption area.

It is also an advantage that no adhesive has to be added to accomplish a connection between the layers of the multi-layered fabric. The addition of an adhesive during the process of manufacturing complicates the process, which is undesired. In addition, the use of an adhesive may lead to a different appearance of the outer fabric (layer L1 and L2), since it may leak through the outer fabric or darken the outer fabric due to densification of the outer fabric.

The surface of a multi-layered fabric of the invention comprises two types of surface areas. The first type concerns the connection areas; these are areas wherein a connection is present between the layer L1 and the layer L2, which connection comprises a fusion of the layer L1 and the layer L2 as set-out hereinabove. The second type of surface area concerns absorption areas. In these areas, the layer L1 and the layer L2 are not connected.

Depending on the shape of the connection areas, the absorption areas may be formed as pockets. The absorption areas are capable of containing a liquid, i.e. liquid that is absorbed by the absorption layer. In particular, the surface of a multi-layered fabric of the invention consists of these two types of surface areas. Thus, an area that is not a connection area is in this case an absorption area.

Usually, the connection areas constitute less than 50% of the surface area of a multi-layered fabric of the invention. Preferably, the connection areas occupy a surface area of the fabric that is a small as possible. This is because the cooling capacity of the fabric decreases when an increasing amount of surface area is present as a connection area, because the connection areas do not contribute to the cooling capacity of the fabric.

In this way, the size and position of the connection area(s) define the size and position of the absorption areas. For example, the multi-layered fabric of the invention comprises a pattern of a plurality of connection areas. The connection areas are then typically adjacent areas, such as circular areas, that form a particular pattern. Instead of a plurality of separate connection areas, the multi-layered fabric of the invention may also comprise one single connection area. Typically, such connection area is in the form of a grid that has the appearance of interlacing lines where the layers L1 and L2 are connected to each other. The grid then defines a plurality of absorption areas (pockets) that lie in the grid, for example rectangular absorption areas in case the angles of the interlaces in the grid are perpendicular angles.

The absorption layer is present between the layer L1 and the layer L2 and is therefore enclosed in the multi-layered fabric. The absorption layer is capable of absorbing a liquid, preferably water, that has permeated the layer L1 (and the layer L2 in case that layer is also liquid-permeable). The locations where the absorption layer primarily absorbs the liquid are the locations where the layer L1 and layer L2 are not connected to each other. These locations form the absorption areas of the multi-layered fabric of the invention. The liquid absorbed will thus be contained between the layers L1 and L2 of the absorption areas, which will drive both layers away from each to provide a pocket that is filled with the liquid (and with the absorption layer).

The absorption layer is in particular capable of absorbing water, by the presence of a water-absorbing polymer in the layer. Such polymers are usually also characterized as superabsorbent polymers (SAP). The absorption layer may essentially consist of the superabsorbent polymer, but it may also comprise an additional material that serves as a support for the superabsorbent polymer. For example, the support material may shield the superabsorbent polymer, so that the fabric of the invention has a dry feeling, e.g. its surfaces are not perceived as wet or sweaty when touching them. Thus, the absorption layer may comprise a support material and a superabsorbent polymer.

By a superabsorbent polymer is meant a water-swellable polymer that is capable of absorbing at least 20 times its weight in water. A polymer that is suitable for use as a superabsorbent polymer in a multi-layered fabric of the present invention may be a synthetic superabsorbent polymer selected from the group of polyacrylates, polyacrylamides, polyvinyl alcohols, ethylene-maleic anhydride copolymers, polyvinylethers, methylcellulose, carboxymethylcellulose, hydroxypropylcellulose, polyvinylmorpholinones, polyacrylamides, polyvinylpyridines, and polyvinylpyrrolidones.

The support material and the SAP may in principle be present in any weight ratio. The support material usually constitutes up to 95 wt. % of the absorption layer. It may also constitute 10-95 wt. % or 25-90 wt. % of the absorption layer. Preferably, it constitutes 30-85 wt. % of the absorption layer, more preferably 40-80 wt. %. The SAP is usually present in such amount that it constitutes at least 2 wt. % of the absorption layer. It may also constitute at least 5 wt. %, at least 10 wt. % or at least 15 wt. % of the absorption layer. When the absorption layer is included in the fusion, then the SAP is preferably present in moderate amounts, for example up to 40 wt. %, up to 35 wt. %, up to 30 wt. %, up to 25 wt. %, up to 20 wt. %, up to 15 wt. % or up to 10 wt. %. All contents mentioned are based on absorption material in the absence of absorbed water.

There are a couple of ways wherein the support material and the SAP can be present in the absorption layer. For example, the SAP can be mixed with the support, and the absorption layer is then prepared from this mix. Thus, the absorption layer may comprise the SAP and the support material as a mixture, for example as a mixture of fine particles, typically particles of less than 1 mm, in particular less than 0.5 mm. To this end, the absorption layer may also comprise a binder.

It is also possible that the support material is present as a layer and that the SAP is present on that layer; typically it is immobilized on such layer. In a particular embodiment, the SAP is present between two layers of support and squeezed there in between so that it is immobilized. Such layers are for example layers of polyolefin, typically with a grammage in the range of 15-50 g/m$^2$. When the SAP is present in such setting, it is well shielded and the fabric of the invention does not feel wet of clammy when it is activated with water.

In addition to being immobilized on a layer of support material or between two layers of support material, the SAP may also be mixed with support material. In this way, a mixture of SAP and support material is present as a single layer, which layer is then present either on a layer of support material or between two layers of support material. In such setting, the support material that constitutes the immobilizing layer(s) is preferably a polyolefin, while the support material that is mixed with the SAP is preferably a (shredded) polyester. This has proven to give a good fusion with the layers L1 and L2, especially when these layers comprise or consist of a polyester, and the $T_g$ of the polyolefin is lower than the $T_g$ of the polyesters used in the multi-layered fabric.

The absorption layer is usually a continuous layer that is also present at the connection areas and, as a result, is also part of the fusion of the layers L1 and L2. The presence of the absorption layer may have an influence on the fusion, but may not lead to a lower quality of the fusion, such as a lower strength or durability, or at least not to an undesirable extent. To effect a strong and durable fusion of the layer L1 and the layer L2 with the absorption layer, the materials of the layer L1 and the layer L2 are preferably fusible with one or more material(s) of the absorption layer—typically with the support material. The materials to be fused and the fusion conditions must therefore be designed in such manner that they do give a fusion with the desired properties. The skilled person knows how to arrive at a fusion with such properties by selecting the proper materials and thicknesses for the layer L1, the layer L2, the SAP and the support material and by choosing the proper process conditions for the realization of the fusion. He can arrive at a suitable process with the right materials by routine experimentation and without exerting inventive effort.

For example, when a SAP is present in the absorption layer, in principle all the thermoplastic properties of the absorption layer must originate from the support material, because a SAP is in principle not fusible. The amount of support material—that is fusible with the materials of the layers L1 and L2—in the absorption layer should therefore not be too low. On the other hand, the SAP should also be present in effective amounts. To this end, a balance must be found between a satisfactory absorption capacity and a satisfactory fusibility of the absorption layer. Such balance is usually reached when the support material constitutes 30-80 wt. % of the absorption layer.

To reach an effective fusibility of the absorption layer, the support material in such cases preferably comprises as much thermoplastic material, in particular thermoplastic polymer, as possible. More preferably, the support material consists of a thermoplastic polymer. The support material may in principle be the same material as the material of the layer L1 and the layer L2, i.e. it may in principle be chosen from the list given hereinabove for the possible materials of the layer L1 and the layer L2. The support material is for example a polyester or a polyolefin selected from the group of polyethylene, polypropylene, poly(ethyleneterephthalate) and (random) copolymers of polypropylene and polyethylene. Suitable polyethylenes include linear low density polyethylene and high density polyethylene. Preferably, the support material comprises a (shredded) polyester or substantially consists of a (shredded) polyester, while the layer L1 and the layer L2 are made of polyester as well. For example, the absorption layer consists of a SAP and a polyester wherein the polyester constitutes 35-65 wt. % of the absorption layer.

The support material in the absorption layer may be present as fibers, e.g. particles with an aspect ratio of at least 10, more preferably at least 25. The aspect ratio may also be at least 50 or at least 100. By the aspect ratio of a fiber is meant the ratio between the length of the fiber and the width of the fiber (wherein the width is the largest cross-section of the fiber perpendicular to its length). The width of the fibers is usually in the range of 1.0-500 µm. In particular, it is in the range of 5.0-200 µm, more in particular in the range of 10-100 µm.

When the support material is present as fibers, the absorption layer that results from mixing the fibers with the SAP is stronger and is better manageable during the manufacturing of the cooling device (e.g. is not easily disrupted or deformed, for example during the step of preparing the layered composition in the method according to the invention as further described below).

The SAP may be present as beads but also as fibers. The advantage of fibrous SAP is that it is easier to reach a uniform distribution of the SAP in the support material, especially it easily mixes with the support material when the support material is also present as fibers. When the SAP is present as beads (e.g. particles wherein the largest dimension is not more than 5 times, not more than 3 times or not more than 2 times larger than the smallest dimension), demixing of the SAP from the support material easily occurs, which leads to a non-uniform distribution of SAP in the support material.

Further, not only the level of SAP in the absorption layer is relevant, but also the size and shape of SAP particles (SAP is usually present as particles that in some way are immobilized by the support material). When particles of SAP are larger, then it is more difficult for any surrounding fusible support material to effectively engage in the fusion with the layers L1 and L2. For example the fusion is less strong or even absent at some locations of the connection area. This is because the support material has difficulties in enclosing the separate SAP particles and simultaneously reaching the fusible material of both the layers L1 and L2. Thus, a small particle size of the SAP is preferred.

It has advantageously been found, however, that when the SAP is present as fibers, this is advantageous for the fusion that is formed between the layer L1, the layer L2 and the absorption layer. This might be because the fusible support material can more easily flow around fibers than particles that have a lower aspect ratio, and so gain an improved contact with the fusible material of both the layers L1 and L2 during the fusion process. This, in turn, then leads to a stronger and more durable fusion between the layer L1, the layer L2 and the absorption layer. Further, it was found that the inclusion of beads of SAP in the fusion gave a surface of the connection area with more irregularities (e.g. the surface is less smooth) than when SAP was used that is present as fibers.

Another proposed reason why fibrous SAP is advantageous for the quality of the fusion, in particular why it contributes to a stronger and more durable fusion, is that they add a fiber-reinforcement to the fusion. Because of the higher aspect ratio of fibers (as compared to beads), the fibers can easily expand their presence in the absorption layer to one or both of the layers L1 and L2. This then predominantly occurs during the period wherein the temperature of the fusion area is increased and the fusion is formed. Moreover, this effect is especially pronounced when ultrasonic welding is used to form the fusion, because the mixing of the materials of the different layers due to the ultrasonic vibrations can then also severely enhance the movement (e.g. translation, rotation) of the SAP fibers.

The aspect ratio of the fibers is preferably at least 10, more preferably at least 25. The aspect ratio may also be at least 50 or at least 100. By the aspect ratio of a fiber is meant the ratio between the length of the fiber and the width of the fiber (wherein the width is the largest cross-section of the fiber perpendicular to its length). The width of the fibers is usually in the range of 1.0-500 µm. In particular, it is in the range of 4.0-250 µm, more in particular in the range of 6.0-100 µm and even more in particular in the range of 10-50 µm.

Another advantage of fibrous SAP is that the content of the SAP in the absorption layer can be increased as compared to an absorption layer with non-fibrous SAP (which is e.g. present as beads that are more or less globular), without impairing the strength and durability of the fusion between the layer L1, the layer L2 and the absorption layer.

Yet another advantage of fibrous SAP is that the activation of the fiber (i.e. the uptake of the liquid) is much faster as compared to an activation wherein the absorption layer comprises non-fibrous SAP such as beads of SAP.

It is also preferred that the $T_g$ of the support material is preferably not much higher than that of the layers L1 and L2. The support material usually has a glass transition temperature ($T_g$) that is lower than the $T_g$ of the material(s) of the layers L1 and L2, or, in case the layers L1 and L2 have a different $T_g$, the $T_g$ is lower than the $T_g$ of the layer that has the lowest $T_g$. The $T_g$ of the support material may for example be up to ten ° C. higher than the $T_g$ of the material of the layers L1 and L2, or, in case the layers L1 and L2 have a different $T_g$, up to ten ° C. higher than the $T_g$ of the layer that has the highest $T_g$. Preferably, however, the $T_g$ of the support material is equal to or lower than that of the layers L1 and L2, or, in case the layers L1 and L2 have a different $T_g$, equal to or lower than the $T_g$ of the layer that has the highest $T_g$.

The absorption layer may, however, also be a discontinuous layer wherein the discontinuities (e.g. holes or openings) at least partly coincide with the connection areas. As a result, only part of the fusion of the layers L1 and L2 also comprises the absorption layer; and in the extreme case, the absorption layer does not form a part of the fusion of the layers L1 and L2 at all. In such case, the fusion consists of the layer L1 and the layer L2. When this is the case, there are in principle no restrictions with respect to the $T_g$ of the support material, since it is not involved in the fusion.

Also when the absorption layer contains holes that do not completely coincide with the connection areas, then there are much less restrictions with respect to the $T_g$ of the support material. For example, when the largest dimension of the holes is less than half of the smallest dimension of the connection area, preferably less than a quarter, then a satisfactory fusion between the layers L1 and L2 can still occur through the holes.

Although absorption material may also be present at the connection areas (e.g. in the event that a continuous absorption layer is used that forms part of the fusion of the layer L2 with the layer L2), these connection areas essentially do not swell when the multi-layered fabric of the invention is activated by immersing it in a liquid, preferably water. This is because the fusion process results in a dramatic decrease of the liquid-permeability, typically the water-permeability, of the layers L1 and L2 at the connection areas, while much of the liquid absorption capacity of the absorption layer has been destroyed. In addition, the direct environment of the SAP has lost much of its flexibility, so that there is essentially no space available for the SAP to swell when it would absorb a liquid.

The invention further relates to a method for preparing a multi-layered fabric, comprising provating a layered composition wherein an absorption layer is present between a layer L1 that is liquid-permeable and a layer L2 that is vapor-permeable and/or liquid-permeable, wherein both layers comprise a thermoplastic material; then selecting an area of the layered composition where a connection between the layer L1 and the layer L2 is desired; then pressing the layer L1 and the layer L2 together at the selected area and providing heat to the selected area so that the layer L1 and the layer L2 fuse at the selected area; then cooling down the selected area to thereby form a connection area wherein a connection is present between the layer L1 and the layer L2.

First, a layered composition is prepared wherein the absorption layer is enclosed between the two layers L1 and L2. There are one or more areas where a connection between the layer L1 and the layer L2 is desired; at these areas a fusion is realized wherein the layer L1 and the layer L2 participate.

A fusion is typically realized by applying heat to the area where the connection is desired, while the layer L1 and the layer L2 are pressed together. After cooling down, the fusion has been formed. The fusing of the layer L1 and the layer L2 may be performed by simply contacting the area with a heated item so that heat is conducted from the item to the area. It may also be performed by a method known as ultrasonic welding, which method comprises applying noise of an ultrasonic frequency to the selected area. This generates heat at the selected area and typically causes a deformation of the surfaces that are to be welded to achieve interpenetration between the surfaces. In case the absorption layer is present at the selected area between the layer L1 and the layer L2, this layer also fuses with the layer L1 and the layer L2 upon heating, and also participates in the fusion after the cooling down.

Usually, in a process of the invention, the temperature of fusing is at or above the $T_g$ of the material of the layers that are to be fused. When the layers have a different $T_g$, then the temperature of fusing is at or above the $T_g$ of the material that has the lowest $T_g$. By the temperature of fusing is meant the temperature that is reached at the selected area during providing heat to the selected area in a process of the invention.

With regard to the glass transition temperatures of the materials in the method of the invention, the same considerations apply as those discussed hereinabove for the multi-layered fabric of the invention.

It is preferred that the temperature of fusing is lower than the melting temperature of the layers that are to be fused. When the layers have a different melting temperature, then the temperature of fusing is lower than the melting temperature of the material that has the lowest melting temperature. Preferably, the temperature of fusing is more than 25° C. lower than the (lowest) melting temperature, more preferably it is more than 40° C. lower. It may also be 30° C. or lower or 50° C. or lower. The closer the temperature of fusing is to the (lowest) melting temperature, the higher is the risk that weak areas in the layer L1 and/or L2 emerge. Such areas typically concern the interface of the connection areas with the absorption areas. Therefore, it is preferred to perform the fusion at a temperature substantially lower than the (lowest) melting temperature.

In a process of the invention, the absorption layer may be included in the fusion of the layer L1 and the layer L2. If so, it preferably comprises a thermoplastic material, typically a material that is fusible with the material of the layer L1 and the layer L2. With regard to the choice of materials, the same considerations apply as those discussed hereinabove for the multi-layered fabric of the invention.

The advantage of including the absorption layer in the fusion is that it leads to an enormous simplification of the production process of the fabric, because the three layers can simply be stacked and then fused at a high throughput. The stacking is straightforward since it is not subject to many positioning requirements, while the fusion can be performed in a single step by pressing the layers together under the application of heat and/or noise of an ultrasonic frequency to the selected area(s). Previously, a controlled positioning of the absorption material was required on the surface areas that were selected to become an absorption area, taking care that no material ended up at a surface area that was selected to undergo the fusion.

The absorption layer may, however, also be designed and positioned in such manner that it does not form part of the fusion of the layer L1 and the layer L2. The absorption layer may for example comprise a plurality of openings. In the process of the invention, the openings may then positioned in such manner that they coincide with the areas of the fabric where a connection between the layer L1 and the layer L2 is desired. The fusion of the layer L1 and the layer L2 then occurs though the openings, so that the absorption layer does not form part of the fusion of the layer L1 and the layer L2.

The absorption layer may also comprise regularly distributed crevices or chinks as non-uniformities in the absorption layer. Such openings are typically smaller than the areas where a connection is desired. Any positioning of such absorption layer between the two layers L1 and L2 would then yield openings (channels) through which the layer L1 and the layer L2 can meet during the fusion process and can fuse without participation of the absorption layer.

The invention further relates to a multi-layered fabric obtainable by the method as described hereinabove.

The invention further relates to a garment comprising a multi-layered fabric as described hereinabove.

In an embodiment, the garment comprises a plurality of connection areas. It may comprise at least 2, at least 4, at least 8, at least 12, at least 20, at least 30, or at least 40 connection areas. Usually, the number of connection areas is in the range of 2-2,000. In particular, it is in the range of 2-10, in the range of 5-50 or in the range of 20-2,000.

In an embodiment, the garment comprises one or two connection areas, in particular one or two connection areas that is/are in the form of a grid. Typically, one such connection area is at a front panel of the garment and another such connection at a back panel of the garment. It is also possible that a panel comprises a plurality of such grid-like connection areas, for example two, three or four.

A garment of the invention may also comprise connection areas that are not grid-shaped (e.g. that do not entirely surround an absorption area), but that have geometric shapes such as shapes selected from the group of circles, ellipses, triangles, rectangles, squares, pentagons and hexagons. Such shapes are usually substantially smaller than grid-like shapes (e.g. with a cross-section in the range of 1-15 mm, in particular in the range of 1-10 mm, more in particular in the range of 1-4 mm), and can be present in substantially higher numbers. For example, the number of such connection areas is 5,000 or less, 2,000 or less, 1,000 or less or 500 or less. It may be in the range of 100-4,000 or in the range of 200-2,000.

In an embodiment, the garment comprises a plurality of absorption areas. It may comprise at least 2, at least 4, at least 8, at least 12, at least 20, at least 30, or at least 40 absorption areas. Usually, the number of absorption areas is in the range of 10-500. In particular, it is in the range of 20-200, more in particular it is in the range of 30-120.

In a preferred embodiment, the garment comprises a connection area that is in the form of a grid, e.g. the layers L1 and L2 are connected to each other in a shape of interlacing lines so that the garment has connection areas that together form one grid-shaped connection area. Such grid then defines a plurality of absorption areas (pockets) that lie in the grid, for example rectangular (in particular square) absorption areas in case the angles of the interlaces in the grid are perpendicular angles. In a garment of the invention, the number of absorption areas defined by a grid-shaped connection area may be the same as the numbers provided hereinabove for the garment.

When a garment of the invention is manufactured from different pieces of the fabric, the edges of the fabric are preferably adjacent to a connection area. This means that when the fabric is cut into the different pieces, the absorption areas are preferably left intact; cutting then occurs preferably through the connection areas.

The invention further relates to a method for the cooling of a body or an object, comprising
  contacting at least the layer L1 of the fabric of the invention (or a garment comprising such fabric) with a liquid, in particular water, so that the liquid is absorbed by the absorption layer and contained between the layer L1 and the layer L2 in the one or more absorption areas; and then
  contacting the resulting fabric (or garment comprising the fabric) with the body or the object.

Hereafter, the fabric or garment may be subjected to air that is not saturated with water vapor, or to a flow of such air so that evaporation is stimulated.

The invention further relates to an activated multi-layered fabric comprising the multi-layered fabric as described hereinabove, wherein a liquid is absorbed by the absorption layer and contained between the layer L1 and the layer L2 in the absorption areas of the multi-layered fabric.

The invention further relates to an activated garment comprising such activated multi-layered fabric.

The invention further relates to a method for cooling a body or an object, comprising contacting the activated multi-layered fabric or the activated garment with the body or the object.

The invention claimed is:
1. A multi-layered fabric comprising:
   a layer L1 that is liquid permeable;
   a layer L2 that is vapor-permeable and/or liquid permeable; and
   an absorption layer between the layer L1 and the layer L2, wherein
   the fabric includes a surface comprising:
     (i) one or more connection areas wherein a connection is present between the layer L1 and the layer L2; and
     (ii) one or more absorption areas wherein no connection is present between the layer L1 and the layer L2, wherein
       the absorption areas are capable of absorbing a liquid such that the liquid is absorbed by the absorption layer and contained between the layer L1 and the layer L2 in the one or more absorption areas; and wherein the connection between the layer L1 and the layer L2 comprises a fusion wherein the layer L1, the layer L2 and the absorption layer participate.

2. The multi-layered fabric according to claim 1, wherein the absorption layer comprises a support material and a water-swellable polymer, and wherein the support material comprises 25-95 wt.% of the absorption layer.

3. The multi-layered fabric according to claim 2, wherein the support material is a thermoplastic material selected from the group consisting of polyethylene, polypropylene, poly(ethyleneterephthalate) and mixtures thereof.

4. The multi-layered fabric according to claim 1, wherein the absorption layer comprises water-swellable polymer fibers having an aspect ratio of at least 10.

5. The multi-layered fabric according to claim 1, wherein the layer L1 and the layer L2 comprise a thermoplastic material selected from the group consisting of acrylate polymers, acrylate copolymers, methacrylate polymers, methacrylate copolymers, polyesters, polyolefins, polyurethanes, poly(ether-ester) elastomers, poly(vinylacetate), ethylene-vinyl acetate co-polymers, vinyl ester polymers and mixtures thereof.

6. The multi-layered fabric according to claim 1, wherein the fabric comprises a pattern of a plurality of the connection areas.

7. The multi-layered fabric according to claim 1, wherein the fabric comprises a connection area in the shape of a grid defining a plurality of the absorption areas.

8. The multi-layered fabric according to claim 2, wherein the support material has a glass transition temperature which is equal to or lower than a glass transition temperature of the layer L1 and the layer L2.

9. A method for preparing the multi-layered fabric according claim 1, comprising:
(a) providing a layered composition wherein an absorption layer is present between a layer L1 that is liquid-permeable and a layer L2 that is vapor-permeable and/or liquid-permeable, wherein the layer L1 and the layer L2 comprise a thermoplastic material;
(b) selecting an area of the layered composition where a connection between the layer L1 and the layer L2 is desired, wherein the absorption layer is present at the selected area between the layer L1 and the layer L2;
(c) pressing the layer L1 and the layer L2 together at the selected area and providing heat to the selected area so that the absorption layer fuses with the layer L1 and the layer L2 at the selected area; and
(d) cooling down the selected area to thereby form a connection area wherein a connection is present between the layer L1 and the layer L2, the connection comprising a fusion wherein the layer L1, the layer L2 and the absorption layer participate.

10. The method according to claim 9, wherein step (c) is practiced by providing heat to the selected area so that the selected area reaches a temperature which is at least 30° C. lower than a melting temperature of the material of each of the layer L1, the layer L2 and the absorption layer involved in the fusion.

11. The method according to claim 9, wherein the absorption layer comprises a thermoplastic material.

12. The method according to claim 9, wherein step (c) comprises conducting ultrasonic welding to cause fusion at the selected layer where the layer L1, the layer L2 and the absorption layer participate.

13. The method according to claim 10, wherein step (c) is practiced such that the temperature of the selected area is at least 40° C. lower than the melting temperature of the material of each of the layer L1, the layer L2 and the absorption layer involved in the fusion.

14. A garment comprising the multi-layered fabric according to claim 1.

* * * * *